United States Patent [19]
Thalhammer

[11] Patent Number: 6,040,535
[45] Date of Patent: Mar. 21, 2000

[54] STARTER SWITCH, IN PARTICULAR IGNITION STARTER SWITCH FOR MOTOR VEHICLE

[75] Inventor: Robert Thalhammer, Iffeldorf, Germany

[73] Assignee: Merit-Malta Ltd., Mriehel, Malta

[21] Appl. No.: 09/002,767

[22] Filed: Jan. 5, 1998

[30] Foreign Application Priority Data

Jan. 8, 1997 [DE] Germany .......................... 197 00 358

[51] Int. Cl.[7] .................................................. B60R 25/02
[52] U.S. Cl. ...................................... 200/43.08; 200/295
[58] Field of Search .............................. 200/43.08, 50.02, 200/61.54, 43.05, 295; 70/239, 252

[56] References Cited

U.S. PATENT DOCUMENTS

| | | | |
|---|---|---|---|
| 3,940,958 | 3/1976 | Kuroki | 70/186 |
| 3,985,009 | 10/1976 | Lipschutz | 200/43.08 X |
| 4,031,728 | 6/1977 | Eichenauer | 70/252 |
| 4,398,073 | 8/1983 | Botz et al. | 200/295 |
| 5,794,469 | 7/1998 | Suzuki | 70/252 |

FOREIGN PATENT DOCUMENTS 93 15 048   3/1995   Germany .
37 26 774 C2   6/1996   Germany .

*Primary Examiner*—Renn S. Luebke
*Attorney, Agent, or Firm*—Michael J. Striker

[57] ABSTRACT

A starter switch formed as an ignition starter switch for a motor vehicle has a rotor, a coupling for receiving a rotatable drive pin of a lock cylinder of a steering lock of the motor vehicle, a unit for releasable mounting of the starter switch on a steering lock housing, guiding a unit for displaceably supporting the starter switch on the steering lock housing transversely to an axial direction of the lock cylinder, and a coupling in which the drive pin is insertable after insertion of the starter switch into the steering lock housing.

10 Claims, 1 Drawing Sheet

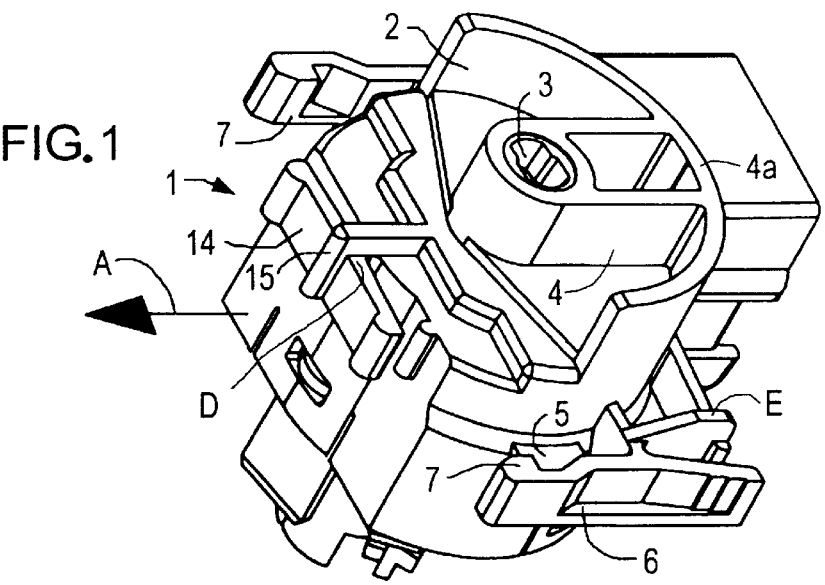
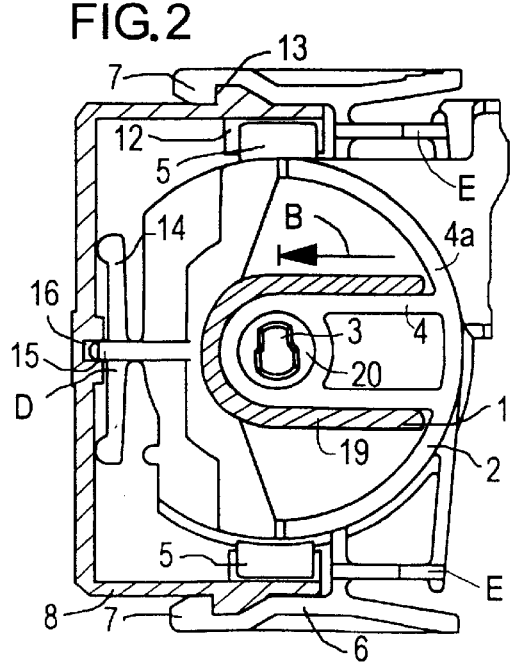
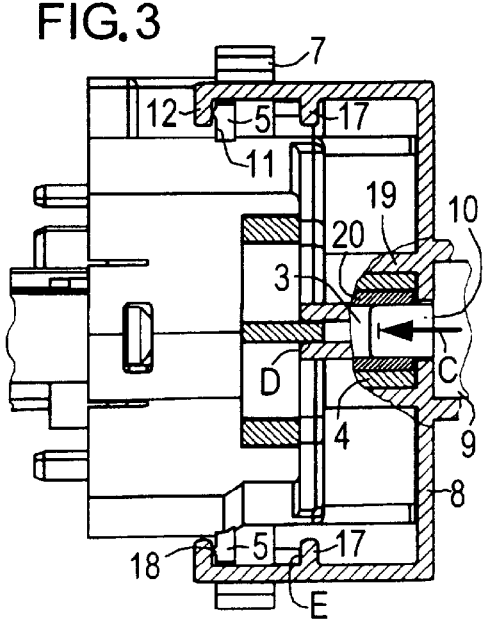

STARTER SWITCH, IN PARTICULAR IGNITION STARTER SWITCH FOR MOTOR VEHICLE

BACKGROUND OF THE INVENTION

The present invention relates to a starter switch, in particular an ignition starter switch for motor vehicles.

More particularly it relates to a starter switch which has a rotor provided with a coupling for receiving a drive pin of a lock cylinder of a steering lock of a motor vehicle, and means for releasable mounting the starter switch on a steering lock housing.

Starting switches of the above mentioned general type are known in the art. One of such starter switches is disclosed for example in the German patent document DE 37 26 774 C2. It has been conventional to insert such an ignition starter switch in the axial direction of the lock cylinder in the steering lock housing and fix it with arresting hooks. The arresting hooks are the mounting means whose holding force is limited. Therefore for example during an auto theft it is possible to release the starter switch from its mounting and, without help of the ignition key, to activate it in the desired manner.

German patent document DE 93 15 048 U1 discloses a starter switch with an additional device which is displaceable on the switch housing transversely to the axial direction of the lock cylinder. The additional device is however freely accessible from the outer side of the switch housing and, by releasing the lateral tilting bracket, can be easily withdrawn from the switch housing.

SUMMARY OF THE INVENTION

Accordingly, it is an object of the present invention to provide a starter switch which has an improved mounting and therefore increased safety against stealing, without increase in manufacturing and mounting expenses.

In keeping with these objects and with others which will become apparent hereinafter, one feature of present invention resides, briefly stated, in a starter switch which is provided with guiding means formed so that the starter switch is supported in a steering lock housing in a displaceable manner transversely to the axial direction of the lock cylinder, and the drive pin after the insertion of the starter switch into the steering lock housing is insertable into the coupling.

Due to the fact that the guiding means extend transversely to the axial direction of the lock cylinder, the starter switch can be inserted only laterally and transversely to the axial direction into the steering lock housing. This means that the starter switch is held form lockingly (in engagement) in the axial direction on the steering lock housing and can not be torn off without substantial force application. The drive pin of the lock cylinder inserted in the coupling of the rotor locks the starter switch against pulling out in the insertion direction and transversely to the axial direction.

The lock cylinder can be turned only by the ignition key in a mounting position, in which it can be withdrawn from the steering lock housing and the drive pin of the lock cylinder can be withdrawn from the starter switch. This means that the drive pins of the starter switch are blocked against lateral withdrawal in a form-locking manner for theft prevention. During the lateral insertion of the starter switch into the steering lock housing, possible attachment points, for example for a screwdriver for axial withdrawal of the starter switch, can be covered by housing parts of the steering lock housing. Thereby the antitheft safety is further increased.

In accordance with another feature of present invention the guiding shoulders are engaged for example by corresponding guiding webs of the steering lock housing extending tranversely to the axial direction, to secure the starter switch against the axial withdrawl from the steering lock housing.

In accordance with still another feature of present invention, the guiding shoulders are formed on bendable transverse webs of the housing and provided with transverse webs which abut with pretensioning against the guiding webs of the steering lock housing. Therefore a gap-free guidance and holding of the starter switch is provided with reduced mounting forces.

In accordance with still another feature of the present invention, the housing of the starter switch can be provided with arresting means for fixing on the steering lock housing against a radial withdrawal. The arresting means can be formed as arresting hooks extending transversely to the axial direction of the lock cylinder. In this construction the starter switch is fixed in its operational position before insertion of the lock cylinder, so that it can be inserted into the steering lock housing at a time which is favorable for mounting.

In accordance with still a further feature of present invention, the housing can be supported opposite to its insertion direction in a springy fashion against the steering lock housing. Therefore the starter switch abuts with its arresting hooks in a springy manner against the corresponding arresting shoulders of the steering lock housing and is fixed in a gap-free manner.

The housing of the starter switch on its insertion side can be provided with at least one flat spring which deviates opposite to the insertion direction and is pressable against the abutment surface of the steering lock housing. The simple flat spring can be injection molded with negligible expenses of one-piece with the housing of the starter switch. For example, two wing-shaped flat springs extending opposite transversely to the insertion direction can be provided and, with a flat construction they allow a symmetrical force application.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a starter switch for mounting in a steering lock housing of a motor vehicle;

FIG. 2 is a plan view of the mounted starter switch of FIG. 1 with parts of the steering lock housing; and FIG. 3 is a partially sectioned side view of FIG. 2.

DESCRIPTION OF PREFERRED EMBODIMENTS

FIG. 1 shows a starter switch 1 with a housing 2. It accommodates a switching mechanism (not shown) with a rotor 20 shown in FIGS. 2 and 3 and is formed as a rotary switch. The rotor 20 is joined with a coupling 3 which is provided with a hollow profile for receiving a matching drive member. Two parallel connecting webs 4 extend from the center of the starter switch 1 to a semi-circular cover web 4a of the housing 2.

The starter switch is insertable in an insertion direction A shown in FIG. 1 into a steering lock housing 8. It is guided on lower and upper transverse webs 5 which radially extend from the housing 2 at opposite sides, and is fixed in the axial direction. The connection webs 4 extend parallel to the insertion direction A. The housing 2 has abutment surfaces D and E for axial support on the steering lock housing 8. The abutment surfaces D and E are arranged at a substantial distance from the central axis of the switch in one plane.

Lateral arresting hooks 6 extend in the insertion direction A and are provided with arresting projections 7 which are perpendicular to the hooks and laterally springy deflectable for arresting the inserted starter switch 1 in the radial position of the steering lock housing 8. The arresting hooks 6 as shown in FIGS. 1 and 2 are formed as rocker-like parts which are made of one piece with the housing 2 and supported on the housing for better actuation.

Wing-like flat springs 14 are arranged on the housing 2 so that they extend at the insertion side transversely to the insertion direction A. They operate for a spring support and pre-tensioning of the starter switch 1 on the inner side of the steering lock housing 8. A projection 15 of the housing 2 is arranged centrally at the insertion side between the flat springs 14 and operates for the position centering of the starter switch 1 in the steering lock housing 8.

The starter switch 1 is inserted in the steering lock housing 8 in direction of the arrow B transversely to the axial direction of a lock cylinder 9 with a drive pin 10 as shown in FIGS. 2 and 3. After this, the lock cylinder 9 is inserted in direction of the arrow C into the steering lock housing 8, so that the profiled drive pin 10 extends into the corresponding hollow profile of the coupling 3.

By rotation of an ignition key suitable for the lock cylinder 9, the drive pin 10 and thereby the rotor 20 can be turned in different switching positions of the starter switch 1. With the drive pin 10 inserted in the starter switch 1, the starter switch 1 can be locked against a lateral withdrawal from the steering lock housing 8.

The springy flexible transverse webs 5 of the housing 2 are provided with a guiding shoulder 11 at their side facing away from the lock cylinder 9. The guiding shoulder is engaged with pre-tensioning by a guiding web 12 of the steering lock housing 8 which extends in the insertion direction A, to secure the axial position of the starter switch 1 in the steering lock housing 8 in a gap-free manner. A deformable transverse rib 18 serves additionally for tolerance compensation. The housing 2 with its abutment surfaces D and E facing the lock cylinder 9 sits or the corresponding countersupports 17 of the steering lock housing 8. The housing 2 is guided in a gap-free manner during lateral insertion into the steering lock housing 8 between the countersupports 17 shown in FIG. 3 and the guiding webs 12. The abutment surfaces D and E which are arranged at a distance from an axis of rotation of the starter switch form a definite three-point support.

In the inserted end position shown in FIGS. 2 and 3, the lateral springy deviatable arresting projections 7 of the arresting hooks 6 engage behind arresting shoulders 13 on the steering lock housing 8 and fix the starter switch in the radial direction against the lateral withdrawal from the steering lock housing 8. The flat springs 14 which face the lock cylinder with pretensioning, press against the steering lock housing 8, so that the arresting projections 7 abut against the arresting shoulders 13 in a gap-free manner. The projection 15 extending in the insertion direction A engages in a corresponding groove-like depression 16 of the steering lock housing 8 and secures the position of the starter switch 1 to prevent its turning.

The steering lock housing 8 is further provided with a U-shaped centering web 19 which surrounds the connecting webs 4 and forms a guiding pocket for it. It facilitates the lateral insertion of the starter switch 1 into the steering lock housing 8 and forms a rotary abutment for receiving the torque which is generated during the switch actuation. This turning prevention is located at the side of the housing 2 which is opposite to the projection 15. Its distance to the projection 15 is so great that favorable lever ratio with low abutment forces is provided. Thereby the housing 2 is held in the steering lock housing 8 in an especially rotation-secure manner.

It will be understood that each of the elements described above, or two or more together, may also find a useful application in other types of constructions differing from the types described above.

While the invention has been illustrated and described as embodied in a starter switch, in particular an ignition starter switch for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A starter switch formed as an ignition starter switch for a motor vehicle, comprising a starter switch housing; a rotor having a coupling for receiving a rotatable drive pin of a lock cylinder of a steering lock; a steering lock housing provided on the motor vehicle; means for releasably mounting the starter switch on the steering lock housing; guiding means for supporting the starter switch on the steering lock housing for displacement transversely to an axial direction of the lock cylinder, said guiding means being formed as guiding shoulders provided on said starter switch housing and extending transversely to the axial direction of the lock cylinder so as to be engaged by guiding webs of the steering lock housing, said guiding shoulders together with the guiding webs forming an abutment against an axial withdrawal of the starter switch from the steering lock housing, said starter switch housing being provided with arresting means for fixing the starter switch housing on the steering lock housing against a radial withdrawal.

2. A starter switch as defined in claim 1, wherein said guiding shoulders are provided with deformable transverse ribs which abut with pretensioning against said guiding webs of the steering lock housing.

3. A starter switch as defined in claim 1, wherein said arresting means include arresting hooks extending transversely to the axial direction of the lock cylinder.

4. A starter switch as defined in claim 3, wherein said arresting hooks are wing-shaped.

5. A starter switch as defined in claim 1, wherein said starter switch housing is formed so that it is supportable on the steering lock housing in a springy manner against an insertion direction.

6. A starter switch as defined in claim 5, wherein said starter switch housing is provided at its insertion side with at least one flat spring which deviates in a direction opposite to the insertion direction and is pressable against abutment surfaces of the steering lock housing.

7. A starter switch as defined in claim 1 wherein said starter switch housing which is provided with a projection extending in an insertion direction and during insertion of the starter switch is insertable into a depression of the steering lock housing, said starter switch housing being also provided with a connecting web which extends opposite to the insertion direction and is insertable in a gap-free manner into a corresponding pocket with a matching U-shaped centering web of the steering lock housing.

8. A starter switch formed as an ignition starter switch for a motor vehicle, comprising a rotor having a coupling for receiving a rotatable drive pin of a lock cylinder of a steering lock of the motor vehicle, means for releasably mounting the starter switch on the steering lock housing; guiding means for supporting the starter switch on the steering lock housing for displacement transversely to an axial direction of the lock cylinder; and a starter switch housing, said guiding means being formed as guiding shoulders provided on said starter switch housing and extending transversely to the axial direction of the lock cylinder so as to be engaged by the steering lock housing, said guiding shoulders forming an abutment against an axial withdrawal of the starter switch from the steering lock housing.

9. A starter switch as defined in claim 8, wherein said starter switch housing is provided with bendable transverse webs, said guiding shoulders being formed on said bendable transverse webs and are provided with transverse ribs which abut with pretensioning against said guiding webs of the steering lock housing.

10. A starter switch as defined in claim 8; and further comprising a starter switch housing which is provided with a projection extending in an insertion direction and during insertion of the starter which is insertable into a depression of the steering lock housing, said starter switch housing being also provided with a connecting web which extends opposite to the insertion direction and is insertable in a gap-free manner into a corresponding pocket with a matching U-shaped centering web of the steering lock housing.

* * * * *